(12) United States Patent
Sanchez

(10) Patent No.: US 8,506,110 B2
(45) Date of Patent: Aug. 13, 2013

(54) ELECTRICAL DEVICE THAT IS TRIGGERED AUTOMATICALLY ON BEING PICKED UP

(75) Inventor: Marcel Sanchez, Aulnay-Sous-Bois (FR)

(73) Assignee: L'Oreal, Paris (FR)

( * ) Notice: Subject to any disclaimer, the term of this patent is extended or adjusted under 35 U.S.C. 154(b) by 471 days.

(21) Appl. No.: 12/793,449

(22) Filed: Jun. 3, 2010

(65) Prior Publication Data

US 2010/0315767 A1    Dec. 16, 2010

Related U.S. Application Data

(60) Provisional application No. 61/220,727, filed on Jun. 26, 2009.

(30) Foreign Application Priority Data

Jun. 3, 2009 (FR) ...................................... 09 02665

(51) Int. Cl.
*F21V 33/00* (2006.01)

(52) U.S. Cl.
USPC ............................. 362/157; 362/137; 132/301

(58) Field of Classification Search
CPC ......... F21V 17/02; F21V 21/30; H01L 33/46; H01L 33/62
USPC ................... 362/223, 249.01, 249.1; 313/45
See application file for complete search history.

(56) References Cited

U.S. PATENT DOCUMENTS

| | | | |
|---|---|---|---|
| 2,177,337 A | 10/1939 | Stein | |
| 5,785,407 A | 7/1998 | Ratcliffe et al. | |
| 6,527,402 B1 * | 3/2003 | Borri | 362/86 |
| 7,393,115 B2 * | 7/2008 | Tokushita et al. | 362/136 |
| 7,878,676 B2 * | 2/2011 | Helenowski | 362/137 |
| 2006/0044786 A1 * | 3/2006 | Johnson | 362/101 |
| 2006/0227537 A1 | 10/2006 | Vanderschuit | |
| 2006/0257195 A1 | 11/2006 | Chen | |
| 2006/0274527 A1 | 12/2006 | Langone | |
| 2010/0182770 A1 * | 7/2010 | Huang | 362/137 |

FOREIGN PATENT DOCUMENTS

| | | |
|---|---|---|
| EP | 1 155 972 A1 | 11/2001 |
| JP | A-2007-060406 | 3/2007 |

OTHER PUBLICATIONS

French Search Report in French Patent Application No. 0902665; dated Dec. 15, 2009 (with English-language translation).

* cited by examiner

*Primary Examiner* — Tracie Y Green
(74) *Attorney, Agent, or Firm* — Oliff & Berridge, PLC

(57) ABSTRACT

An electrical device including a support made out of an electrically-insulating material, at least one battery, at least one electrical component, and electrical conductors that connect the battery to the electrical component. The support is configured to be fastened under an item that can be handled by a user, or forming part of the item. The electrical conductors include at least one electrical conductor fastened mechanically to the support, the electrical conductor being possibly configured to be subjected to movement relative to the battery or to another conductor in response to thrust exerted vertically on the device, causing the electrical component to be automatically powered electrically when the item is picked up off a surface on which it was standing, causing the component to automatically cease to be powered electrically when the item is put back on the surface.

15 Claims, 6 Drawing Sheets

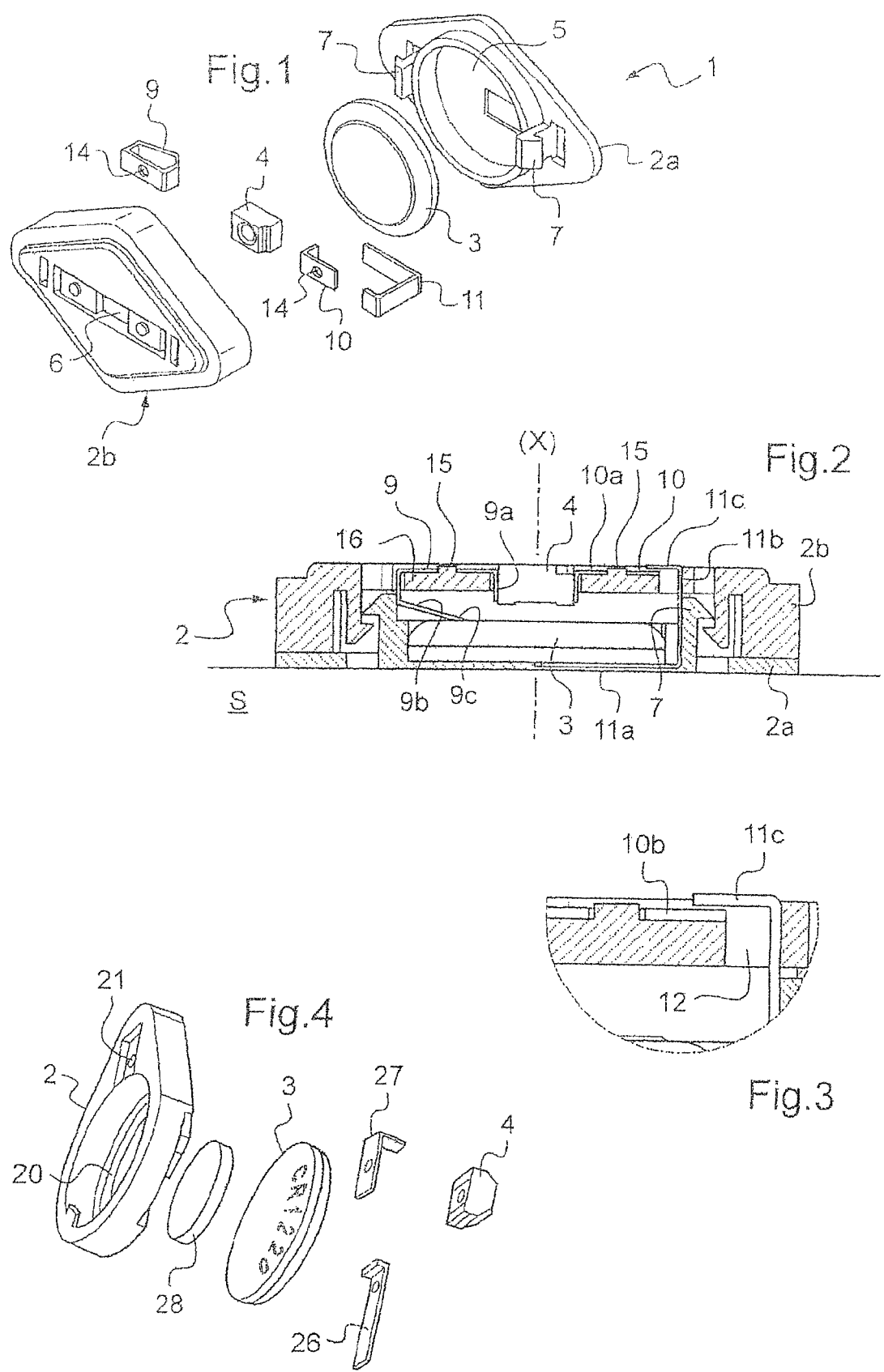

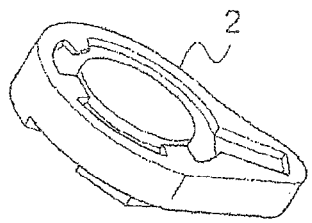
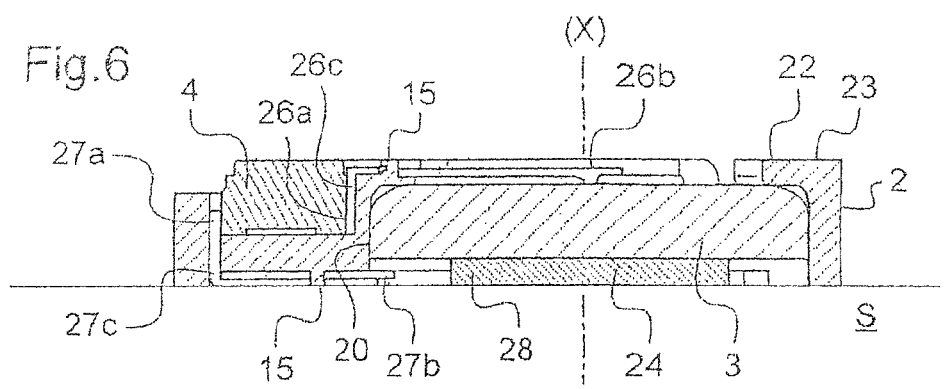
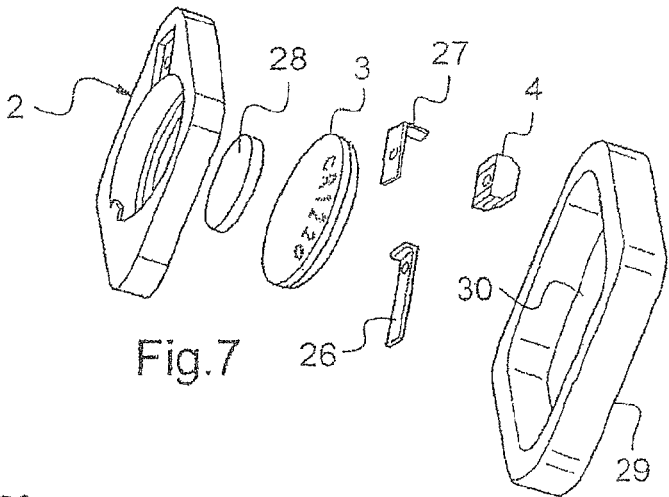
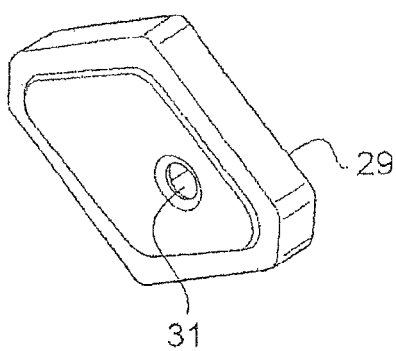

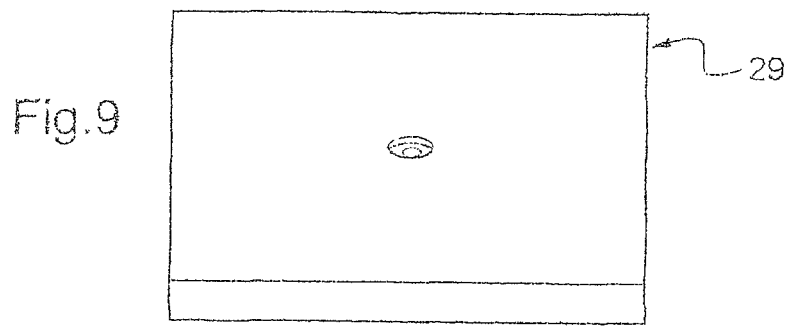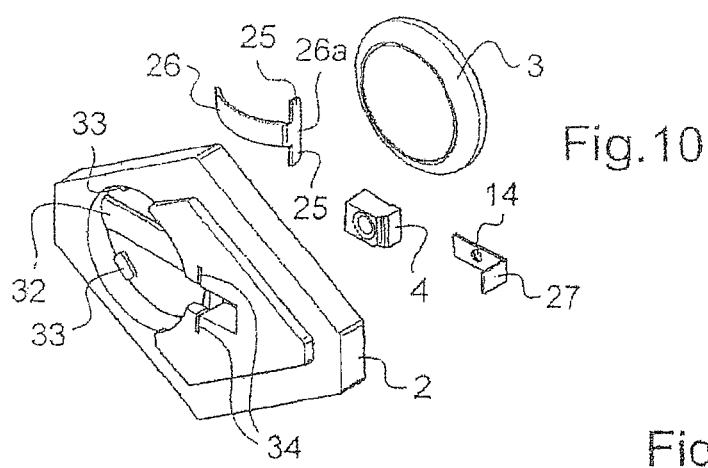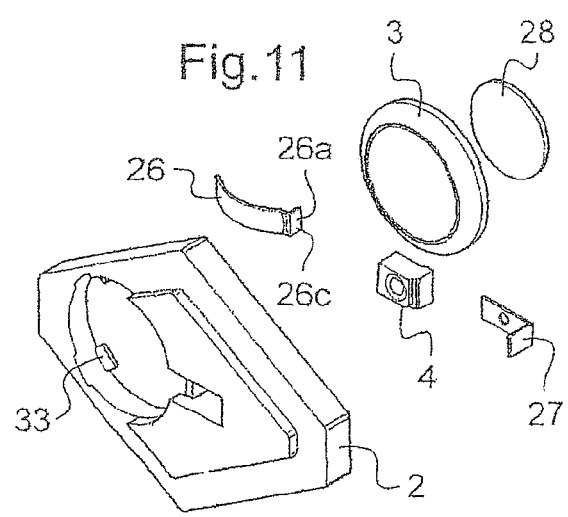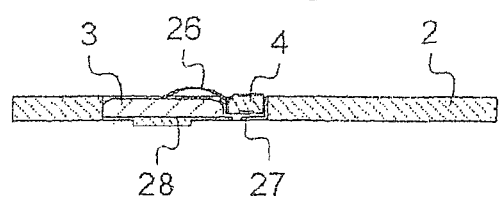

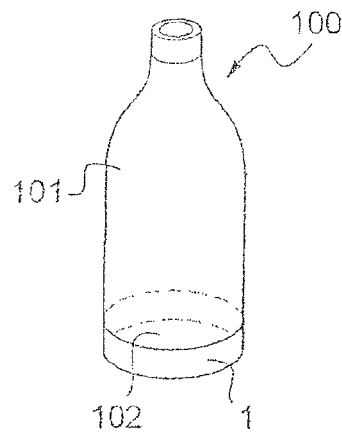
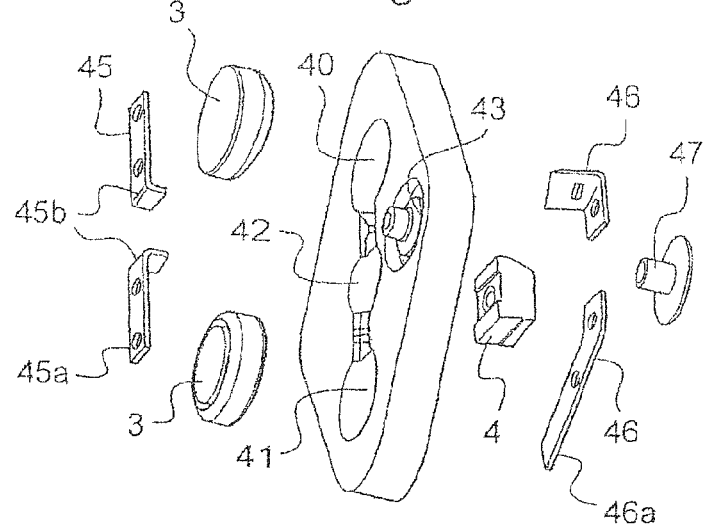
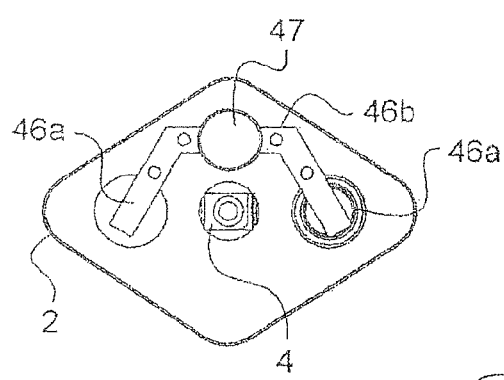
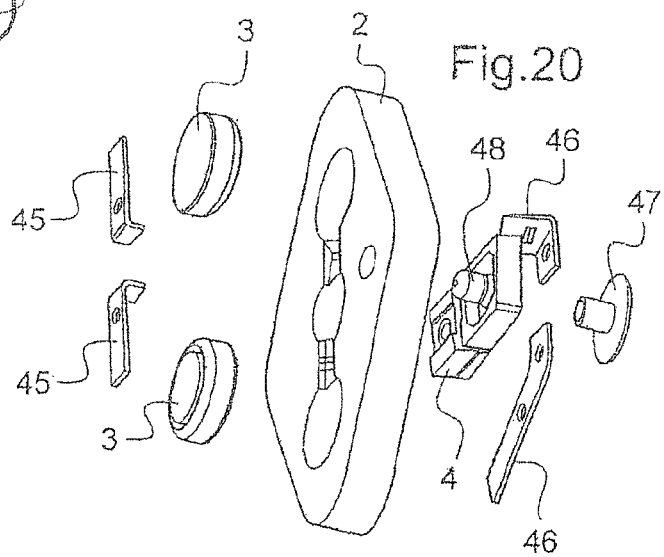
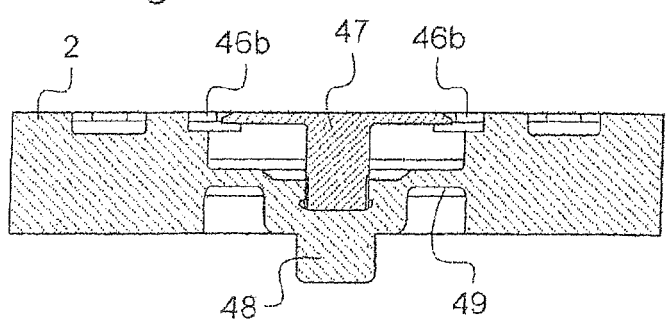

ELECTRICAL DEVICE THAT IS TRIGGERED AUTOMATICALLY ON BEING PICKED UP

FIELD OF THE INVENTION

The present invention provides an electrical device forming part of an item that can be handled by a user, or that is configured to be fastened under such an item, e.g. packaging of a cosmetic or care-product composition.

BACKGROUND OF THE INVENTION

It is known from US applications Nos. 2006/0257195 and 2006/0274527 to make a stand for a container containing a liquid, the stand including a light source and a printed circuit, and the light source lighting up when the container is picked up.

The presence of the printed circuit adds to the bulkiness of the device, and makes it more difficult to recycle, where appropriate.

EP 1 155 972 describes perfume packaging including a base that houses means for generating a sound or a light that are activated by a pushbutton returning elastically when the packaging is picked up.

JP 2007-60406 relates to a remote-control housing including a pushbutton formed under the housing and configured to open the electrical circuit for powering the remote control when said remote control is standing on a surface.

U.S. Pat. No. 5,785,407 describes a beverage container under which there is fastened an electrical device including a printed circuit, the device being configured to activate a light source disposed on the wall of the container, when the container is filled with liquid or when it is put down with a particular force on a surface.

There exists a need to benefit from an electrical device for fastening under an item that can be handled by a user, or for incorporating in such an item, that is more compact, simple to manufacture, and reliable in operation, such a device being more particularly, but not exclusively, intended for causing at least one light source to light up when the item is picked up.

OBJECT AND SUMMARY OF THE INVENTION

Exemplary embodiments of the invention provide an electrical device, comprising:
- a support made out of an electrically-insulating material, said support being configured to be fastened under an item that can be handled by a user, or forming part of the item;
- at least one battery, preferably that is housed in the support, at least in part;
- at least one electrical component for being powered by the battery; and
- electrical conductors that connect the battery to the electrical component;

the electrical conductors including at least one electrical conductor that is fastened mechanically to the support, said electrical conductor being capable of being, in particular being configured to be, subjected to movement relative to the battery or to another conductor in response to thrust exerted vertically on the device, in such a manner that the electrical component is automatically powered electrically when the item is picked up off a horizontal plane surface on which it was standing, and in such a manner that the component automatically ceases to be powered electrically when the item is put down on said surface. When the item is put down, powering may cease instantaneously or in timed manner, in the presence of a time delay. In addition, powering may begin in instantaneous or timed manner when the device is picked up.

In certain exemplary embodiments, the battery is movable relative to the support in response to the device being picked up. Relative movement may take place between the battery and the above-mentioned electrical conductor, the electrical conductor being suitable for remaining stationary relative to the support.

In other exemplary embodiments, the battery remains stationary relative to the support when the device is picked up.

Picking the device up may vary the spacing between the battery and said electrical conductor and/or vary the spacing between said electrical conductor and another electrical conductor. Such a configuration of the battery and an electrical conductor or of the electrical conductors may provide automatic powering of the component and/or automatic termination of said powering when the device is picked up. The battery may be received inside the support, being in particular received in a housing, so as to be movable relative to the support in response to a vertical force being exerted on the device when the device is picked up.

The relative movement of the electrical conductor may be bending of a portion thereof, the conductor being suitable for keeping one point stationary relative to the support, in particular a fastening point for fastening mechanically to the support.

The support may be configured to be fastened under the item in such a manner that a portion of the support remains stationary relative to the item, regardless of whether or not the item is picked up.

The support may be other than an element that projects from the bottom face of the device when said device is picked up, in particular other than a pushbutton. When the support is fastened under an item, the major fraction, in particular at least 50%, at least 70%, at least 80%, or even 100% of the bottom surface of the item covers the support.

The term "electrical conductor that is fastened mechanically to the support" means an electrical conductor that is not soldered on the support or on a printed-circuit track secured to the support, the electrical conductor being, for example, received with friction in a housing formed in the support, held by heading (plastically flattening the tip of the conductor) or by snap-fastening on the support, or even by being held locally on the support by an element fitted on the support, the element possibly being said electrical component, where appropriate. In certain exemplary embodiments, at least one of the electrical conductors may thus be retained on the support by clamping the conductor between a terminal of the electrical component and a backing surface of the support. At least one of the conductors may include a hole, and the support may include a pin that is received in the hole and that is headed (its tip is flattened plastically), the pin being molded integrally with the support, for example.

The conductor that is fastened mechanically to the support may be subjected to movement relative to the battery or to another conductor, without being deformed, in particular without being deformed elastically, e.g. being rigid.

By way of example, the electrical component is a light source, e.g. a light-emitting diode (LED), thereby making it possible to light up the item by means of the electrical device when the item is moved, thereby reinforcing the appeal of the item.

By way of example, the electrical component is an LED of the surface mount device (SMD) type. By way of example, the LED is in the shape of a rectangular block and includes two opposite faces that define electrical terminals, said faces being metal-plated, for example. The LED may be received in a rectangular housing and may use its terminals to press two electrical conductors fitted on the support and in contact therewith against the support, so as to hold them on the support, at least in part.

The electrical component may be housed in the support, at least in part, if not entirely. The electrical component may be disposed in the support in such a manner as to light up the bottom of the item under which the support is fastened.

By way of example, at least one of the electrical conductors, or even all of the electrical conductors, is a metal blade, of thickness lying in the range 0.1 millimeters (mm) to 1 mm, and of width lying in the range 1 mm to 5 mm, for example. The device need not have any insulated flexible conductor wires, and all of its electrical contacts may be achieved without bonding.

At least one of the electrical conductors, e.g. the electrical conductor that is fastened mechanically to the support, or even all of the electrical conductors, may be other than helical springs.

The electrical conductor that is urged to deform elastically may be other than a conductive layer covering all or part of the support, such a layer being for example secured to the support at any point of said layer.

The device need not have a printed circuit, all of the electrical conductors being fastened mechanically to the support.

The battery(ies) may be of the button-battery type, of initial voltage lying in the range 1.5 volts (V) to 3 V, for example.

At least one of the electrical conductors may include an elastically-deformable portion; or the support may include an elastically-deformable zone that is in permanent contact with an electrical conductor; or the device may include an elastically-deformable part that is fitted on the support and that is in permanent contact with the electrical conductor; said elastically-deformable portion or zone or part being urged to deform elastically when the device is standing on a horizontal plane surface, and being suitable for exerting an elastic return action that tends to establish and/or interrupt an electrical contact when the device is picked up.

At least one of the conductors may include an elastically-deformable portion that is urged to deform elastically when the device is standing on a horizontal plane surface, and that is suitable for exerting an action that tends to establish an electrical contact when the device is picked up.

The electrical conductor that is urged to deform elastically may be urged without leading to deformation of the support, the support presenting rigidity that is greater than the rigidity of said electrical conductor, for example. At least one of the electrical conductors, e.g. the above-mentioned electrical conductor that is urged to deform elastically, may be in permanent contact with the battery. At least one of the conductors may optionally come into contact with another electrical conductor, depending on whether or not the device is picked up.

At least one of the electrical conductors may contribute to retaining the battery in its housing, which electrical conductor needs to be detached from the support in order to put the battery into place or to remove it.

The support may be a one-piece part, e.g. being made by molding thermoplastic material. In a variant, the support may comprise a plurality of parts, e.g. parts that are movable relative to one another, or that are assembled together in stationary manner. In particular, the support may include two parts that are movable relative to each other, e.g. at least two parts that are interfitted one inside the other, at least in part. The above-mentioned electrical conductor that is urged to deform elastically, may be interposed between the two parts.

By way of example, the item may be a perfume bottle or any other packaging made with a bottom that is not opaque, e.g. transparent. The above-mentioned LED may light up the bottom of the packaging when the device is picked up, e.g. with a blue color.

The electrical device may include a base in which the support is mounted, the base being for fastening under the item. In a variant, said base may form part of the item.

The device may include a film that is fastened under the support, covering the battery and/or at least one of said conductors, at least in part. The film may participate in holding one or more electrical conductors on the support.

In first exemplary embodiments of the invention, the support includes a top portion and a bottom portion that are movable relative to each other, the battery being received in a housing formed in the bottom portion of the support, for example, and the electrical component being received in a housing formed in the top portion of the support, for example.

In these first exemplary embodiments, the electrical conductors may include a flexible first electrical conductor that connects a first terminal of the electrical component and a first pole of the battery, the first conductor including at least one elastically-deformable portion that is configured to exert a resilient-return force between the top portion and the bottom portion of the support, so as to cause them to be moved when the device is picked up.

By way of example, the electrical conductors include:
  a second electrical conductor that is fastened mechanically to the top portion of the support, and that includes a first end that is connected to the second terminal of the electrical component; and
  a third electrical conductor that includes a first end that is connected to the second pole of the battery;
  each of the second and third electrical conductors including a second end, for example, and the second end of the second electrical conductor and the second end of the third electrical conductor being selectively connected together as a function of the position of the top portion of the support relative to the bottom portion of the support.

In these first exemplary embodiments, the invention makes it possible to power the electrical component as a function of movement of at least a portion of the top portion of the support relative to the bottom portion of the support, accompanied by movement of at least a portion of the second electrical conductor relative to the battery. By way of example, the relative movement results from the item under which the electrical device is fastened, or of which the device forms a part, being picked up off a surface on which it was standing, thereby causing the disappearance of a reaction force exerted by said surface on the support as a result of the weight of the item.

By way of example, the second electrical conductor and the third electrical conductor are configured to be connected together when the item is held in the air.

In second exemplary embodiments of the invention, the battery is received with the possibility of movement in a first housing that is formed in the support, and the electrical component is received in a second housing that is formed in the support and that is distinct from the first housing.

By way of example, the electrical conductors comprise:
  a first electrical conductor, in particular a flexible conductor, including a stationary first end that is connected to a first terminal of the electrical component, and a free second end that is configured to bear against a first pole of the battery; and
  a second electrical conductor that is fastened mechanically to the support and that is stationary, for example, the conductor including a first end that is connected to a second terminal of the electrical component and a second end.

By way of example, the first end of the first electrical conductor extends into the second housing.

By way of example, the second pole of the battery selectively comes into contact with the second end of the second electrical conductor as a function of the position of the battery in the first housing, the position being modified by the device being picked up.

In these second exemplary embodiments, electrically powering the electrical component depends on the battery moving in the first housing, i.e. corresponding to the battery moving relative to the second electrical conductor. By way of example, the movement results from the user picking up the item under which the electrical device is fastened, or of which the device forms a part.

The device may include an intermediate element that is present under the battery, e.g. a pad that is fastened under the battery, e.g. bonded thereunder, and that projects from the bottom face of the device when said device is picked up.

When the device is standing on a plane surface, the plane surface exerts an upward force on the intermediate element that may bring the battery into a position in which it does not power the electrical component. When the device is picked up, the force exerted on the intermediate element disappears, thereby causing the battery to be moved into a position in which it enables said component to be powered electrically. In particular, the battery may come to bear against an electrical conductor when the device is picked up, and move away from the electrical conductor when the device is put down.

The above-mentioned film may include an opening for passing the intermediate element, in particular the above-mentioned pad.

In third exemplary embodiments of the invention, the device includes two batteries, respectively received in first and second housings formed in the support, and the electrical component is received in a third housing fowled in the support.

By way of example, the electrical conductors comprise:
  two first electrical conductors that connect a first pole of each battery to a different terminal of the electrical component;
  two second electrical conductors that include a first end that is connected to the second pole of each battery and a second end; and
  at least one third electrical conductor that is fastened mechanically to the support, directly or indirectly, and that is movable relative to the first and second electrical conductors, depending on whether or not a vertical force is exerted on the device, the third electrical conductor making it possible selectively to connect together the second ends of the second electrical conductors, as a function of whether or not the device is picked up.

The term "fastened directly" should be understood to mean fastened to the support without an intermediate part, and the term "fastened indirectly" should be understood to mean fastened to the support via an intermediate part.

In the first and second embodiments of the invention, the electrical conductors that are fastened mechanically to the support are fastened directly to the support, for example.

The support may include at least one zone that deforms in response to the device being picked up, and the third electrical conductor may be fastened mechanically to the deformable zone of the support, for example. By way of example, the deformable zone may be a thin zone of the support and/or may be made out of an elastomer material.

In a variant of the third exemplary embodiments, the device includes at least one elastically-deformable part that deforms in response to the device being picked up, the part being fitted to the support and the third electrical conductor being fastened mechanically to said part.

The deformable zone of the support, or, in a variant, the elastically-deformable part fitted on the support, may be in permanent contact with the third electrical conductor, being urged to deform elastically when the device is standing on a horizontal plane surface, and being configured to exert an elastic return action that tends to establish an electrical contact when the device is picked up.

In these third exemplary embodiments, the electrical component is powered as a function of at least one portion of the third electrical conductor moving relative to the support and relative to the two batteries, as a result of the user picking up the item under which the electrical device is fastened, or of which the device forms a part.

By way of example, the third conductor is a disk or a metal washer that is carried by a stud that projects from the bottom face of the device when said device is picked up.

Other exemplary embodiments of the invention also provide packaging for a cosmetic composition, said packaging comprising:
  a container containing the composition, the container including a bottom wall; and
  an electrical device as defined above, secured to the bottom wall of the container.

By way of example, the electrical component is a light source that is configured to light up the bottom of the container, e.g. with a blue-colored light.

Other exemplary embodiments of the invention also provide an electrical device, comprising:
  a support;
  a battery that is movable in a housing of the support;
  an electrical conductor that is capable of being contacted electrically, being in particular configured to be contacted electrically, by the battery when the device is picked up;
  an electrical component for being powered electrically by the battery; and
  an intermediate element that projects from the bottom face of the support when the device is picked up;
  the battery being entrained by the movement of the intermediate element when the device is standing on a horizontal plane surface via its bottom face and the battery moving away from said electrical conductor, in such a manner as to power the electrical component only when the device is picked up.

By way of example, the intermediate element is a pad that is bonded under the battery, or a tab that extends under the battery, said tab being secured to the support and carrying a portion in relief.

A film may be fastened to the support, e.g. for retaining the battery in its housing. The film may have a hole therethrough for passing the intermediate element.

BRIEF DESCRIPTION OF THE DRAWINGS

The invention can be better understood on reading the following description of non-limiting embodiments thereof, and on examining the accompanying drawings, in which:

FIG. 1 is an exploded view of an electrical device in a first embodiment of the invention;

FIG. 2 is a section view of the device shown in FIG. 1;

FIG. 3 shows a detail of FIG. 2;

FIG. 4 is an exploded view of an electrical device in a second embodiment of the invention;

FIG. 5 shows the FIG. 4 electrical device when it is assembled;

FIG. 6 is a section view of the device shown in FIG. 5;

FIG. 7 is an exploded view of another device in the second embodiment of the invention;

FIGS. 8 and 9 show various examples of bases receiving devices;

FIGS. 10, 11, 13, 15, 16, and 17 show variants of the FIG. 7 electrical device, and FIGS. 12 and 14 are section views of the FIGS. 11 and 13 devices, respectively;

FIG. 18 is an exploded view of a device in a third embodiment of the invention;

FIG. 19 is a plan view of the FIG. 18 device, when said device is assembled;

FIG. 20 is a variant of the FIG. 18 device;

FIG. 21 is a section view of the FIG. 18 device, when said device is assembled; and FIG. 22 is a diagram showing an example of packaging that includes an example of an electrical device of the invention.

MORE DETAILED DESCRIPTION

Figure 13:
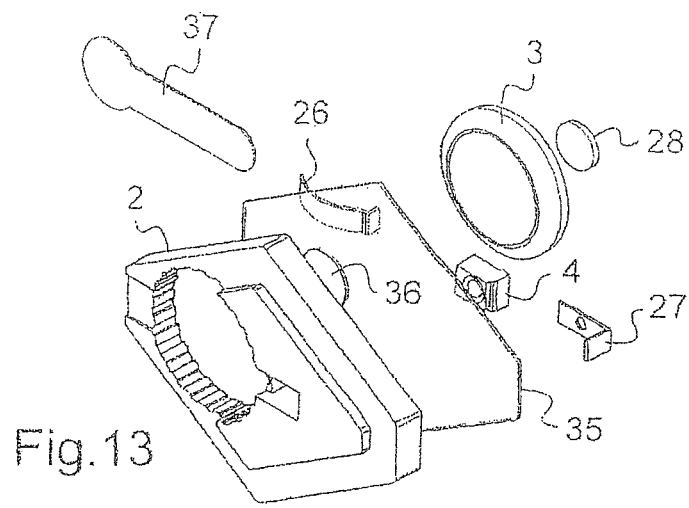

FIGS. 1 and 2 show an electrical device 1 in a first embodiment of the invention.

As shown, the device 1 includes a support 2 that may comprise a top portion 2b and a bottom portion 2a that are movable relative to each other, e.g. in translation along an axis X that is oriented vertically, for example. By way of example, each of the portions 2a and 2b has a shape that is generally flat perpendicularly to the axis X.

During use, the top portion 2b is secured to an item, e.g. being fastened to a bottom wall of said item that may be a container containing a cosmetic or care-product composition.

By way of example, the portions 2a and 2b of the support are made out of electrically-insulating material, e.g. a thermoplastic material, e.g. polyolefin or silicone rubber, a ceramic, cardboard, paper, or wood.

The device 1 may include a battery 3 and an electrical component 4 that, in the embodiment described, is a light source, e.g. a light-emitting diode (LED) of the SMD type.

The battery 3 may be a button battery, e.g. of the CR 12-20 type, optionally-rechargeable.

As shown, the battery 3 may be received in a housing 5 of the bottom portion 2a of the support 2, and the light source 4 may be received in a through housing 6 that is formed in a top wall of the top portion 2b.

The two portions 2a and 2b are limited in the extent they can move apart, e.g. by snap-fastening the two portions together, one inside the other.

As can be seen in FIG. 2, the bottom portion 2a of the support may include fastener means 7, e.g. tabs provided with teeth, e.g. disposed on either side of the housing 5, and the top portion 2b includes corresponding fastener means 8, e.g. tabs provided with teeth, that are arranged to co-operate with the fastener means 7.

The electrical device 1 shown in FIGS. 1 and 2 includes three electrical conductors 9, 10, 11 that are fastened mechanically to the support 2.

By way of example, the first and second conductors 9 and 10 are retained in the top portion 2b of the support, and the third conductor 11 may be held against the bottom portion 2a of the support by the battery 3 when it is placed in the housing 5, as can be seen in FIG. 2.

As shown in the figure, the electrical component 4 may be connected at its first terminal to a first end 9a of the first conductor 9, and at its second terminal to a first end 10a of the second conductor 10.

In the embodiment described, the first conductor is a flexible conductor having a portion 9b that extends between the top portion 2b and the bottom portion 2a of the support, e.g. obliquely, as shown.

The first conductor 9 includes a second end 9c that is connected to a first pole of the battery 3.

The second conductor 10 includes a second end 10b that may open out to a through passage 12 that is formed in the wall of the top portion 2b.

The first and second conductors 9 and 10 may include holes 14 for receiving pins 15 that are molded integrally with the top wall 16 of the top portion 2b. The holes 14 contribute to holding the conductors 9 and 10 together with the electrical component 4. The pins 15 are headed (their tips being flattened by being plastically deformed).

In the embodiment shown, the ends of the first and second conductors 9 and 10 coming into contact with the electrical component 4 are formed by downwardly-directed rims.

The third conductor 11 may present a shape having two bends, as in the embodiment shown. It includes a first end 11a in contact with the second pole of the battery 3, and a middle portion 11b that extends between the bottom portion 2a and the top portion 2b of the support 2, with the middle portion 11b passing through the passage 12. It also includes a second end 11c that is formed by an inwardly-directed rim.

In the embodiment in FIG. 2, the electrical device 1 is shown with a force exerted thereon along the axis X, which corresponds to when the item, under which the electrical device 1 is fastened, or of which the electrical device 1 forms a part, is standing on a plane surface S.

The electrical circuit is open given the clearance existing between the ends 10b and 11c, as can be seen in FIG. 3.

When the device is picked up, the top and bottom portions 2b, 2a, move apart, aided by the return action of the flexible portion 9b, and the conductors 10 and 11 enter into contact at their ends. This enables the LED to light up.

Electrical devices in a second embodiment of the invention are described below with reference to FIGS. 4 to 17.

By way of example, the support 2 is a one-piece part, unlike that described with reference to FIGS. 1 to 3, and may include a first housing 20 for receiving the battery 3, and a second housing 21 for receiving the electrical component 4, e.g. a light source, e.g. an LED of the SMD type, as in the embodiment in FIGS. 1 to 3.

By way of example, the first housing 20 is open at both of its axial ends 22 and 24. In the embodiment in FIGS. 4 to 6, the support 2 includes teeth 23 at its top end 22 for holding the battery 3 in the housing 20.

The electrical device 1 includes electrical conductors that are fastened mechanically to the support 2, the conductors comprising a first conductor 26 and a second conductor 27.

The first conductor 26 may comprise a flexible portion and include a stationary first end 26a that is connected to a first terminal of the electrical component 4 and that is received in the second housing 21, and a free second end 26b that is configured to bear against a first pole of the battery, in such a manner as to urge it to move downwards.

By way of example, the second electrical conductor 27 is of bent shape, including a first end 27a that is connected to a second terminal of the electrical component 4 and that is received in the second housing 21, and a second end 27b that opens out to the bottom end 24 of the first housing 20.

By way of example, the first conductor 26 and the second conductor 27 are retained on the support by means of holes 14 receiving pins 15 of the support, which conductors are held by means of rims 26c and 27c pressed against corresponding backing surfaces of the support by the electrical component 4.

The device 1 may also include an intermediate element that projects from the bottom face of the support when the device is picked up. In the embodiment in FIGS. 4 to 7, 11 to 15, and 17, the intermediate element is a pad 28 that is bonded to the bottom face of the battery 3, and that is made out of a cellular or elastomer material, for example.

The pad 28 may contribute to preventing the item from sliding on the surface on which it is standing.

At rest, as shown in FIG. 6, the bottom face of the pad 28 bears against the horizontal plane surface S on which the device is standing, the surface S exerting an upward force on the pad 28, bringing said pad substantially level with the bottom end 24 of the first housing 20, thereby holding the bottom face of the battery 3 away from the end 27b, so the electrical circuit remains open.

Figure 14:
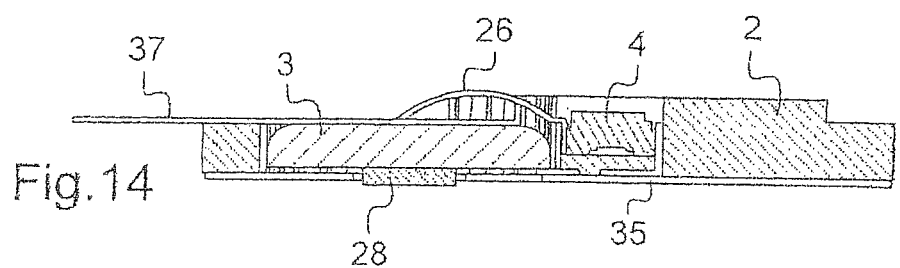

While the electrical device 1 is moved, when it is picked up by the user, the battery 3 may move in the housing 20 under the effect of the resilient return of the flexible portion 26b, and while it is moving, it may come into contact with the second end 27b, which results in the closing of the electrical circuit between the battery 3 and the electrical component 4, whereas the pad 28 projects from the bottom surface of the support 2, as shown in FIGS. 12 and 14.

As shown in FIG. 7, the electrical device 1 may include a base 29 that includes a housing 30 configured to receive the support 2.

By way of example, the base 29 is fastened under the item by adhesive, by heat-sealing, in particular by ultrasound, or by mutual engagement, and the support 2 is fastened in the housing 30, e.g. by adhesive or mutual engagement.

By way of example, and as shown in FIG. 8, the base 29 includes an opening 31 for positioning in register with the electrical component 4 when said electrical component is positioned in the housing 30. Thus, when the electrical component 4 is a light source, the light emitted by said light source may propagate through the opening 31. In a variant, the base 29 is made out of a transparent material.

The base 29 may be of any shape, e.g. as a function of the shape of the bottom wall of the packaging under which the electrical device 1 is fastened.

In the embodiment in FIG. 7, the base 29 is lozenge shaped, and in the embodiment in FIG. 9, the base 29 is in the shape of a rectangle, but it could also be in the shape of a circle, an ellipse, an annulus, or a polygon.

The base 29 may also be made integrally with the item for being lit by the light source carried by the support 2.

In the embodiments shown in FIGS. 10 to 17, the first conductor 26 is arcuate in shape.

In the embodiment in FIG. 10, the bottom wall of the support 2 is wide open in the first housing 20, the bottom of said housing comprising a bridge of material 32 and two teeth 33. The bridge of material 32 acts as an intermediate element, including a portion in relief (not shown) that makes it possible to raise the battery 3 in the first housing 20 when the device is standing on a horizontal plane surface.

At its first end 26a, the first conductor 26 includes two lugs 25 for co-operating mechanically with slots 34 of the second housing 21 for fastening the first conductor 26 mechanically to the support 2. Similar to that described with reference to FIGS. 4 to 6, the second conductor 27 is fastened to the support 2 by being clamped between a backing surface of the support and a terminal of the electrical component 4, by engaging a pin 15 in a hole 14, then by heading the pin (plastically flattening its tip).

Figure 16:
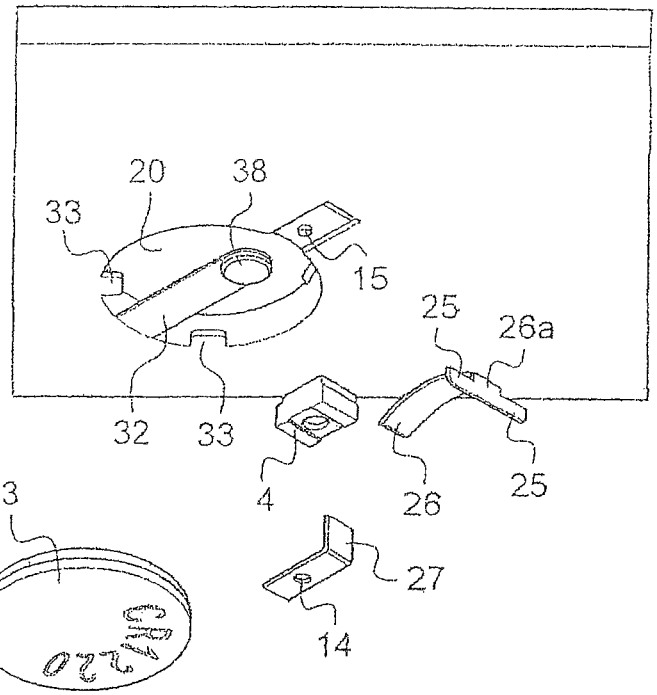

In the embodiment in FIG. 16, the bridge of material 32 is replaced by a tab carrying a portion in relief 38 that acts as an intermediate element that projects from the bottom face of the device when said device is picked up, and that makes it possible to raise the battery in the first housing when the device is standing on a horizontal plane surface.

In the embodiment in FIG. 11, at its first end 26a, the first conductor 26 includes a straight portion 26c for being held against the support 2 by friction against the electrical component 4 when said electrical component and the first conductor 26 are both disposed in the second housing 21. In the embodiment shown, the bottom wall of the first housing 20 includes teeth 33 for retaining the battery.

Figure 15:
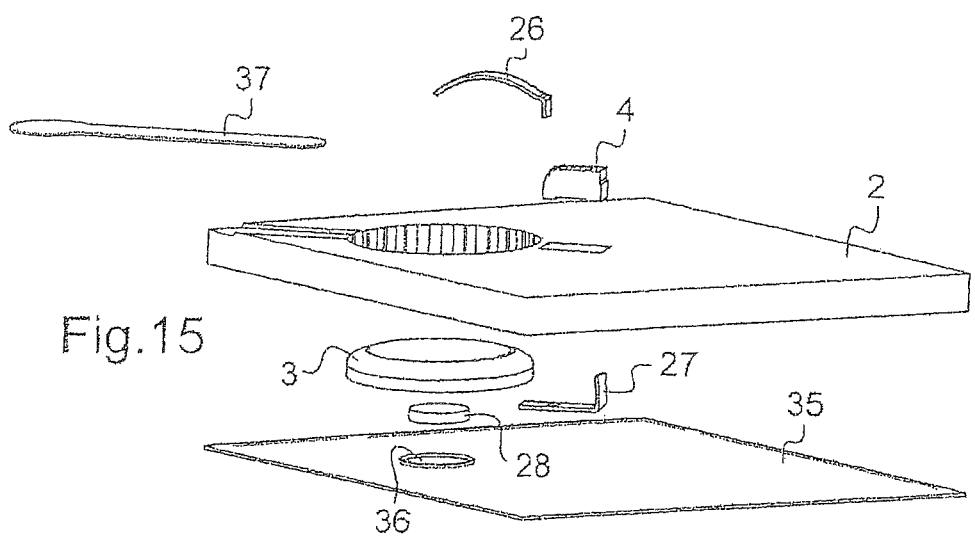

In the embodiments in FIGS. 13 to 15, the electrical device 1 includes a holding film 35, e.g. including a first face that is covered in an adhesive and that is for fastening to the support 2, and a second face on which information, e.g. commercial references or a list of ingredients, may be printed and on which the device may stand.

The holding film 35 may include an opening 36 for passing the pad 28 that is bonded under the battery 3. The opening 36 may present a diameter that is less than the diameter of the first housing 20, so as to enable the film 35 to retain the battery 3 on the support.

As shown in FIGS. 13 to 15, the device 1 may include a tab 37 made out of insulating material that is interposed between the battery 3 and the first conductor 26 before first use, and that is removed by the user during first use, for example.

Figure 17:
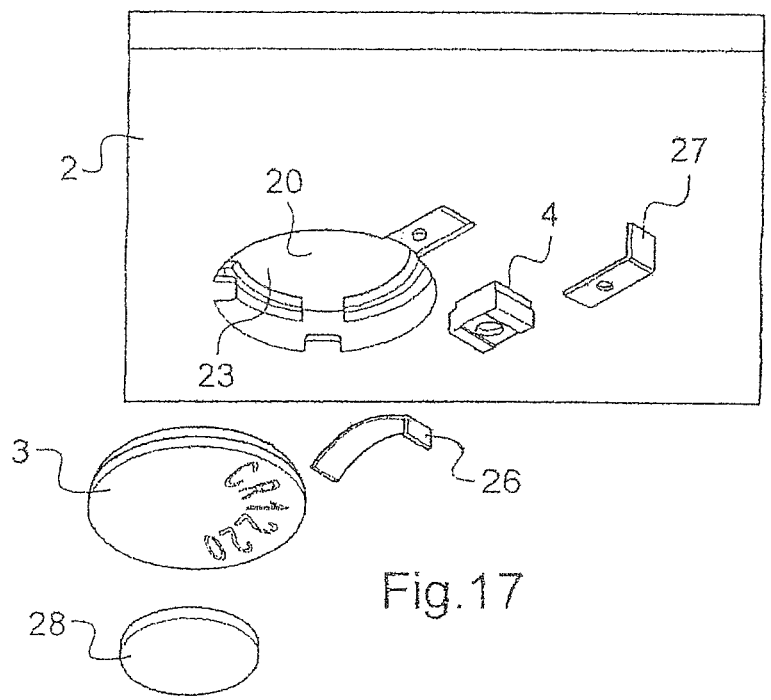

In the embodiment shown in FIG. 17, the teeth 23 of the top wall 22 extend in a circular arc in the first housing 20.

Electrical devices 1 in a third embodiment of the invention are described below with reference to FIGS. 18 to 21, in which the support 2 includes a first housing 40 and a second housing 41, each for receiving a battery 3, and a third housing 42 for receiving the electrical component 4.

The two batteries 3 are disposed in the housings 40 and 41 with opposite polarities relative to each other.

The electrical device 1 includes electrical conductors that are retained mechanically on the support 2.

In the embodiment under consideration, the conductors include two first conductors 45 that include first ends 45a, each connected to a respective pole of a battery 3 and second ends 45b, each connected to a respective terminal of the electrical component 4. The ends 45b may be formed by rims that are clamped between the electrical component 4 and a backing surface of the support, and the conductors 45 may include holes for receiving pins of the support.

The electrical device 1 also includes two second conductors 46, e.g. of shape having a bend in a single plane parallel to the plane of the blades, each of said second conductors including a first end 46a that is connected to the other pole of the corresponding battery 3 and possessing a second end 46b.

By way of example, and as shown in FIG. 19, the conductors 46 include two holes for receiving pins of the support for the purpose of fastening the conductors to the support. By way of example, the pins are headed (their tips are flattened plastically).

The electrical device 1 also includes a third conductor 47 that is received in a housing 43.

In the embodiment in FIGS. 18 and 21, the support 2 is made out of elastomer material and includes a deformable portion 48 defined by at least one thin zone 49 of the support 2, and on which the third conductor 47 is fastened mechanically.

When the device 1 is picked up, the elastically-deformable portion 48 elastically urges the conductor 47 to bear against the conductors 46, as can be seen in FIG. 21, thereby closing the electrical circuit. When the device 1 is standing on a horizontal plane surface, the deformable portion 48 is pushed upwards, and raises the conductor 47 out of contact with the conductors 46.

In the embodiment shown in FIG. 20, the support 2 is made out of non-elastomer plastics material, and an elastically-deformable part 48 made out of elastomer is fitted on the support 2, the third conductor 47 being fastened mechanically to the part 48.

FIG. 22 shows an example of a packaging 100 of a cosmetic or care-product composition. The device 100 may include a container 101 containing the composition, provided with a bottom wall 102.

An electrical device 1 as described above is fastened, e.g. by adhesive, by bonding, or by mutual engagement, to the bottom wall 102.

The invention is not limited to the embodiments described above.

The invention is not limited to a particular number of batteries 3.

In a variant not shown, the battery 3 is replaced by a rechargeable battery and the item under which the electrical device 1 is fastened, or of which it forms a part, includes a stand making it possible to charge the rechargeable battery when the item is placed on the stand. When the item is picked up, the rechargeable battery stops charging and the electrical component is powered.

The electrical component 4 need not be a light source, e.g. it may be a vibration source, e.g. a disk motor driving an off-center fly-weight in rotation, a piezoelectric device, an electric heater member, or an electronic circuit for delivering a sound message.

The expression "comprising a" should be understood as signifying "comprising at least one".

What is claimed is:

1. Packaging for a cosmetic or care-product composition, said packaging comprising:
   a container containing the composition, the container including a bottom wall; and
   an electrical device, fastened to the bottom wall of the container, the electrical device comprising: a support made out of an electrically-insulating material; at least one battery; at least one electrical component; and electrical conductors that connect the battery to the electrical component;
   wherein at least one of the electrical conductors includes an elastically-deformable portion, or the support includes an elastically-deformable zone that is in permanent contact with an electrical conductor, or the electrical device includes an elastically-deformable part that is fitted on the support and that is in permanent contact with the electrical conductor; and
   wherein the elastically-deformable portion or zone or tart is urged to deform elastically when the device is standing on a horizontal plane surface, and is configured to exert an elastic return action that tends to establish and/or interrupt an electrical contact when the device is picked up in such a manner that the electrical component is automatically powered electrically when the item is picked up off a surface on which it was standing, and in such a manner that the component automatically ceases to be powered electrically when the item is put back on said surface.

2. Packaging according to claim 1, the at least one battery being housed in the support, at least in part.

3. Packaging according to claim 1, the electrical component being a light source.

4. Packaging according to claim 1, said device not having a printed circuit.

5. Packaging according to claim 1, at least one of the electrical conductors being retained on the support by clamping the conductor between a terminal of the electrical component and a backing surface of the support.

6. Packaging according to claim 1, at least one of the electrical conductors including a hole, and the support including a pin that is received in the hole.

7. Packaging according to claim 6, the pin being held in the hole with its tip being headed.

8. Packaging according to claim 1, the electrical component being an LED of the SMD type.

9. Packaging according to claim 1, at least one of the electrical conductors being a metal blade.

10. Packaging according to claim 1, the at least one battery being of the button-battery type.

11. Packaging according to claim 1, said elastically-deformable portion being in permanent contact with the at least one battery.

12. Packaging according to claim 1, at least one of the electrical conductors being in permanent contact with the at least one battery and coming into contact with another electrical conductor when the device is picked up.

13. Packaging according to claim 1, at least one of the conductors contributing to retaining the at least one battery in its housing, which electrical conductor needs to be detached from the support in order to put the at least one battery into place or to remove it.

14. Packaging according to claim 1, the support being a one-piece part, or the support comprising a plurality of parts.

15. Packaging according to claim 1, the at least one battery being movable relative to the support in response to the device being picked up.

* * * * *